United States Patent [19]

Ejima et al.

[11] Patent Number: 5,737,648
[45] Date of Patent: Apr. 7, 1998

[54] PHOTOMETRIC DEVICE FOR A CAMERA

[75] Inventors: Satoshi Ejima, Tokyo; Yasuo Kitsugi, Kawasaki, both of Japan

[73] Assignee: Nikon Corporation, Tokyo, Japan

[21] Appl. No.: 494,350

[22] Filed: Jun. 26, 1995

[30] Foreign Application Priority Data

Aug. 22, 1994 [JP] Japan .................. 6-196724

[51] Int. Cl.$^6$ .................. G03B 7/00; G03B 17/20
[52] U.S. Cl. .................. 396/276; 396/272; 396/268; 396/273; 396/100
[58] Field of Search .................. 354/402, 406, 354/407, 408, 430, 476, 480; 396/100, 268, 272, 276, 273

[56] References Cited

U.S. PATENT DOCUMENTS

| | | | |
|---|---|---|---|
| 3,827,064 | 7/1974 | Kiyohara et al. | 354/402 |
| 4,178,084 | 12/1979 | Matsumoto et al. | 354/430 |
| 4,557,580 | 12/1985 | Suzuki | 354/476 |
| 5,214,466 | 5/1993 | Nagano et al. | 354/402 |
| 5,420,661 | 5/1995 | Hamada et al. | 354/430 |
| 5,422,700 | 6/1995 | Suda et al. | 354/402 |
| 5,467,161 | 11/1995 | Odaka | 354/402 |
| 5,485,239 | 1/1996 | Ohsawa | 354/402 |
| 5,486,892 | 1/1996 | Suzuki et al. | 354/479 |
| 5,489,965 | 2/1996 | Mukai et al. | 354/471 |

*Primary Examiner*—Safet Metjahic
*Assistant Examiner*—Michael Dalakis

[57] ABSTRACT

A photometric device, to measure light incident from a photographic lens of a camera, which can perform accurate photometry, independently of the direction of polarization of the incident light. The photometric device is provided with a first semi-transparent mirror, located between the photographic lens and an imaging plane of the camera, for dividing incident light from the photographic lens into a reflected beam and a transmitted beam. A second semi-transparent mirror is located in a position where the reflected beam from this first semi-transparent mirror is incident, and divides the incident light into a reflected beam and a transmitted beam. A photometric unit, for performing photometry, is located in a position to receive light of the transmitted beam from the second semi-transparent mirror.

20 Claims, 5 Drawing Sheets

| REFLECTION/ TRANSMISSION PROPORTION | REFLECTED LIGHT | | TRANSMITTED LIGHT | |
|---|---|---|---|---|
| | S POLARIZED LIGHT | P POLARIZED LIGHT | S POLARIZED LIGHT | P POLARIZED LIGHT |
| 5 : 5 | 65 | 35 | 35 | 65 |
| 6 : 4 | 69 | 51 | 31 | 49 |
| 7 : 3 | 85 | 55 | 15 | 45 |
| 5 : 5 A PORTION FULLY REFLECTING MIRROR | 82 | 52 | 18 | 48 |

FIG. 5

PHOTOMETRIC DEVICE FOR A CAMERA

BACKGROUND OF THE INVENTION

1. Field of the Invention

The present invention relates to a photometric device to measure light passing through the photographic lens of a camera, and in particular, relates to using semi-transparent mirrors to direct light having equal portions of S polarized and P polarized light onto a photometric device.

2. Description of the Related Art

A Through-The-Lens ("TTL") type of photometric device is known, which measures light passing through a photographic lens of a camera. FIG. 3 is a diagram of a photoelectric still camera having a TTL photometric device. A photographic lens 1a is mounted in a camera body 1. A semi-transparent mirror 2, formed by a dielectric film body on a glass substrate, is located on an optical axis of the photographic lens 1a. A sub-mirror 3 is located on the rear surface of the semi-transparent mirror 2. A rangefinding unit 4 receives the transmitted light from the sub-mirror 3 and measures the focal distance to the photographic subject. A focus plate 5 is located in a position to image the reflected light of the semi-transparent mirror 2. A field lens 6 and a pentaprism 7 are located along an optical axis, at the rear side of the focus plate 5. A relay lens 8 and an ocular lens 9 are located along the optical axis of light reflected by the pentaprism 7. A photometric element 11 is located in a position to receive, via a condensing lens 10, a portion of the reflected light of the pentaprism 7. A shutter 14, located on the rear surface side of the semi-transparent mirror 2, close to an imaging surface 15 of the photographic lens 1a, receives a reduced optical image from a field lens 16 and a relay lens 17. A photographic imaging element 19 prevents moiré in the imaging surface due to this relay lens 17, via an optical low pass filter 18.

In the known photoelectric still camera, the light beam, incident from the photographic lens 1a, is divided by the semi-transparent mirror 2 into a transmitted beam and a reflected beam. The transmitted beam, reflected by the sub-mirror 3, is incident on the rangefinding unit 4, while the reflected beam is incident on the pentaprism 7, via the focus plate 5 and the field lens 6. The light beam reflected in the interior of the pentaprism 7 is observed by the photographer via the relay lens 8 and the ocular lens 9. A portion of the light beam reflected by the pentaprism 7 is condensed by the condensing lens 10 and received by the photometric element 11.

When a release button (not shown) is half depressed, the photometric element 11 measures the portion of the incident light reflected from the pentaprism 7, to determine a luminosity value of the subject. Based on the luminosity value of the subject, the aperture value and the shutter opening time are set by the photographer, or by a microcomputer or the like (not shown).

When the release button is fully depressed, the semi-transparent mirror 2 and the sub-mirror 3 are moved out of the way, and the shutter 14 is opened. The incident light beam from the photographic lens 1a passes through the opening of the shutter 14 and forms a space image on the imaging plane 15. The space image, reduced via field lens 16 and relay lens 17, is again imaged in the light receiving surface of the imaging element 19. The optical low pass filter 18 removes the high pass component of spatial frequency of the optical image. The imaging element 19 photoelectrically converts into image signals which are recorded on a memory card or other recording medium (not shown).

In comparison with an external light type of photometric device, in the known TTL photometric device, because direct photometry is performed on the incident light beam from the photographic lens 1a, the change of luminosity of the image surface can be correctly measured even with a different photographic lens 1a, or even when using various optical filters and the like. Nevertheless, in prior photometric devices, when several polarized components are contained in the incident light path, severe problems arise.

FIG. 4 is a diagram showing the optical properties of a semi-transparent mirror. FIG. 5 is a table of the properties of dielectric film semi-transparent mirrors. As shown in FIG. 4, incident light is decomposed into linearly polarized light ("S polarized light"), which vibrates perpendicularly with respect to the incident surface, i.e. in a plane parallel to the incident direction and reflection direction of the light, and linearly polarized light ("P polarized light"), which vibrates parallel with respect to the incident surface. As shown in FIG. 5, at the reflecting surface of a semi-transparent mirror, for example, the semi-transparent mirror 2, the reflectance of S polarized light becomes high, and the reflectance of P polarized light becomes low. However, light reflected by window glass or other perpendicular surfaces contains polarized light having a perpendicular plane of vibration, and because a large component of this kind of polarized light passes through the semi-transparent mirror 2 as P polarized light, it is not received by the photometric element 11. Accordingly, the photometric value as measured by the photometric element 11 becomes low in comparison with the amount of light incident from the photographic lens 1a. The exposure value is increased corresponding to the photometric value, such that there is a problem that the image will be photographed at an excessive exposure. Moreover, light incident from horizontal surfaces, such as the surface of water, contains polarized light whose plane of vibration is horizontal. A large component of such polarized light is reflected by the semi-transparent mirror 2 as S polarized light and is received in the photometric element 11. Therefore, the photometric value as determined by the photometric element 11 is high, in comparison with the actual natural light received. Thus, the exposure value is decreased and the image is photographed at an insufficient exposure.

Where the camera is used in an upright position or in a transverse position, the inclination of the semi-transparent mirror 2 within the camera varies, and the reflectance of polarized light changes, with respect to subjects which contained linearly polarized light. Therefore, the photometric values differ between the upright and transverse positions of the camera.

Furthermore, when photographing a subject in color, a linearly polarizing filter is typically attached to the camera, in order to eliminate reflected light from water surfaces. However, due to the direction of polarization of the light passing through the polarized light filter, because the reflectance of the semi-transparent mirror 2 differs, correct photometry cannot be performed. As a result, the linearly polarizing filter cannot be used if clarity of color is desired.

SUMMARY OF THE INVENTION

Accordingly, it is an object of the present invention to provide a photometric device of a camera which can perform accurate photometry, independently of the respective amounts of P polarized light and S polarized light.

Additional objects and advantages of the invention will be set forth in part in the description which follows, and, in part, will be obvious from the description, or may be learned by practice of the invention.

Objects of the present invention are achieved in a photometric device comprising a first optical dividing member to divide incident light into a first reflected beam and a first transmitted beam, a second optical dividing member to divide the first reflected beam into a second reflected beam and a second transmitted beam, and a photometric unit to perform photometry on the second transmitted beam.

Objects of the present invention are also achieved in a photometric device comprising a first optical dividing member to divide incident light into a first reflected beam and a first transmitted beam, a second optical dividing member to divide the first reflected beam into a second reflected beam and a second transmitted beam and a photometric unit to perform photometry on the second reflected beam.

Objects of the present invention are further achieved in a photometric device comprising a first optical dividing member to divide incident light into a first reflected beam and a first transmitted beam, a second optical dividing member to divide the first reflected beam into a second reflected beam and a second transmitted beam having approximately equal portions of S polarized light and P polarized light, and a photometric unit to perform photometry on the second transmitted beam.

Objects of the present invention are also achieved in a photometric device for a camera having a photographic lens and an imaging plane, the photometric device comprising a first optical dividing member positioned between the photographic lens and the imaging plane to divide incident light into a first reflected beam and a first transmitted beam, the first optical dividing member having a first reflection ratio of P polarized light and a first reflection ratio of S polarized light, a second optical dividing member positioned to receive the first reflected beam to divide the first reflected beam into a second reflected beam and a second transmitted beam, the second optical dividing member having a second transmission ratio of P polarized light and a second transmission ratio of S polarized light, a photometric unit to perform photometry on the second transmitted beam, wherein the product of the first reflection ratio of P polarized light and the second transmission ratio of P polarized light is approximately equal to the product of the first reflection ratio of S polarized light and the second transmission ratio of S polarized light.

Objects of the present invention are also achieved in a photometric device comprising a first semi-transparent mirror located between a photographic lens and an imaging plane of a camera, the first semi-transparent mirror dividing incident light from the photographic lens into a reflected beam and a transmitted beam, a second semi-transparent mirror, located in a position where the reflected beam from the first semi-transparent mirror is incident, to divide the incident light into a reflected beam and a transmitted beam, and a photometric unit to perform photometry, the photometric unit located in a position to receive light of the transmitted beam from the second semi-transparent mirror.

Objects of the present invention are also achieved in a photometric device comprising a first semi-transparent mirror, located between a photographic lens and an imaging plane of a camera, the first semi-transparent mirror dividing incident light from the photographic lens into a reflected beam and a transmitted beam, a second semi-transparent mirror, located in a position where the transmitted beam from the first semi-transparent mirror is incident, to divide the incident light into a reflected beam and a transmitted beam, and a photometric unit to perform photometry, the photometric unit located in a position to receive light of the reflected beam from the second semi-transparent mirror

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 5 is a table of the properties of dielectric film semi-transparent mirrors.

DESCRIPTION OF THE PREFERRED EMBODIMENTS

Figure 1:
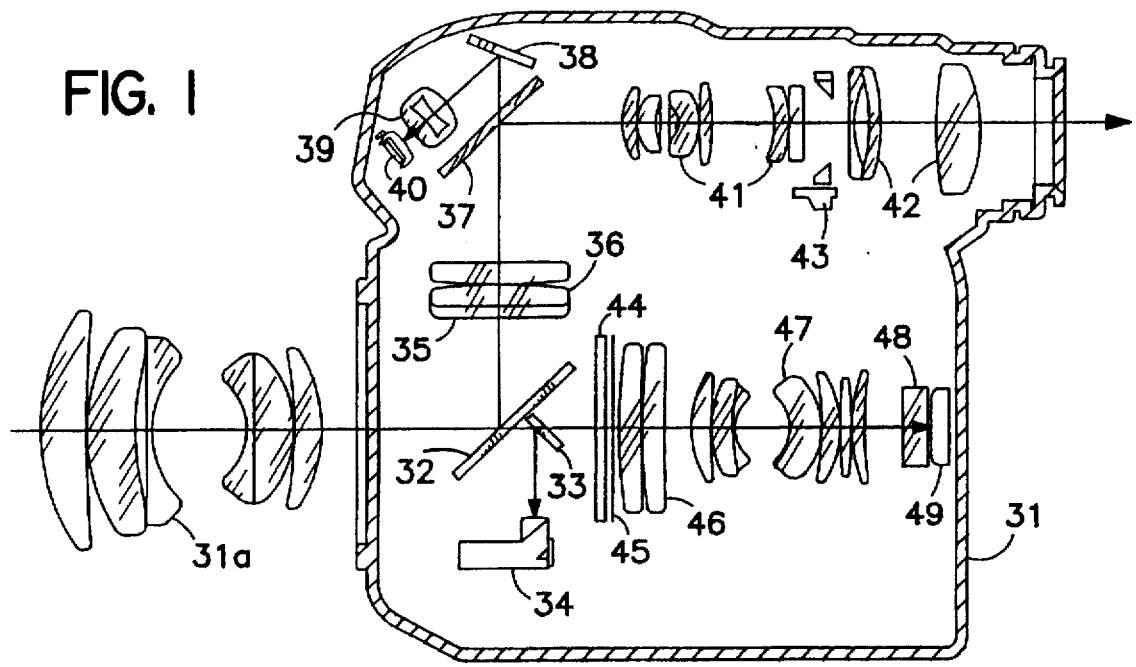
FIG. 1 is a diagram of an electronic still camera having a photometric device in accordance with a first preferred embodiment of the present invention.

Reference will now be made in detail to the present preferred embodiments of the present invention, examples of which are illustrated in the accompanying drawings, wherein like reference numerals refer to like elements throughout.

FIG. 1 is a diagram of an electronic still camera having a photometric device in accordance with a first embodiment of the present invention. A photographic lens 31a is mounted in a camera body 31. A semi-transparent mirror 32 is formed by a dielectric film on a surface of a glass substrate. A sub-mirror 33 is located on the rear surface of the semi-transparent mirror 32. A rangefinding unit 34, to measure the focal distance to the subject, is located in a position to receive light reflected by the sub-mirror 33. A focus plate 35 is located in a position to image the light reflected by the semi-transparent mirror 32. A field lens 36 and a semi-transparent mirror 37 are located along the optical axis on the rear surface side of the focus plate 35. The semi-transparent mirror 37, preferably formed by coating titanium oxide ($TiO_2$) dielectric film on the surface of a glass substrate, is located parallel to the semi-transparent mirror 32. A mirror 38, a condensing lens 39 and a photometric element 40 are located on the rear side of the semi-transparent mirror 37. A relay lens 41, an ocular lens 42 and a viewfinder display unit 43 are located along the optical axis of the light reflected by the semi-transparent mirror 37.

A shutter 44 is located close to the imaging plane 45 of the photographic lens 31a. A field lens 46, which reduces the optical image of the imaging plane 45, and a relay lens 47, are located on the rear surface side of the semi-transparent mirror 32. An imaging element 49, in conjunction with an optical low pass filter 48, eliminates moiré in the imaging plane imparted by the relay lens 47.

The incident light beam from the photographic lens 31a is divided, by the semi-transparent mirror 32, into a transmitted beam and a reflected beam. The transmitted beam is reflected by the sub-mirror 33 and is incident on the rangefinder unit 34. The reflected beam is incident on the semi-transparent mirror 37, via the focus plate 35 and the field lens 36. The image reflected by the semi-transparent mirror 37, is reversed top to bottom, and right to left. Thus, the relay lens 38 images a space image. The photographer observes this space image via the ocular lens 42. The viewfinder display unit 47 is located around the space image, and displays camera information.

The transmitted beam of the semi-transparent mirror 37, after having been reflected by the mirror 38, is condensed by the condensing lens 39, and the light is received in the photometric element 40. When a release button (not shown) is half depressed, the photometric element 40 measures the luminosity of the subject. Based on the luminosity of the subject, an aperture value and a shutter opening time are set by the photographer, or by a microcomputer or the like.

When the release button is fully depressed, the semi-transparent mirror 32 and the sub-mirror 33 move upwards, and the shutter 44 opens. The light beam, incident from the photographic lens 31a, passes through the opening of the shutter 44 and forms a space image in the imaging plane 45. The space image is reduced, via the field lens 46 and the relay lens 47, and is converted into a picture signal by the imaging element 49, and is recorded in a memory card (not shown) or other recording medium.

FIG. 5 is a chart showing the ratio of reflection and transmission for a semi-transparent mirror 32 and 37. When using 5:5 semi-transparent mirrors, 65% of the S polarized light incident from the photographic lens 31a is reflected by the semi-transparent mirror 32. The semi-transparent mirror 37 transmits 37% of this light. Therefore, the photometric element 40 receives 23% of the S polarized light. The semi-transparent mirror 32 reflects 35% of the P polarized light incident from the photographic lens 31a. Because 65% of this light is transmitted by the semi-transparent mirror 37, 23% of the P polarized light is received in the photometric element 40. As the proportion of S polarized light and P polarized light received in the photometric element 40 is equal, a photometric value can be obtained in a fixed proportion with respect to the luminosity of the image plane independently of the direction of polarization of the light contained in the light from the subject. Accordingly, photographs can be taken with the correct exposures.

Moreover, the semi-transparent mirror 37 reflects 42% of S polarized light and 12% of P polarized light. Where the light contains equal amounts of S polarized light and P polarized light, as does natural light, 27% of the light incident from the photographic lens 31a is reflected by the semi-transparent mirror 37 to form an optical image in the viewfinder. When the viewfinder is brightened, using the ratio of reflected light and transmitted light of 7:3, as shown in FIG. 5, in the semi-transparent mirror 32, one of 6:4 is used in the semi-transparent mirror 37.

Through proper selection of the mirrors, 85% of the S polarized light incident from the photographic lens 31a is reflected in the semi-transparent mirror 32. But because 31% of this light is transmitted by the semi-transparent mirror 37, only 26% of S polarized light is received by the photometric element 40. Moreover, 55% of the P polarized light incident from the photographic lens 31a is reflected by the semi-transparent mirror 32, while only 49% of this light is transmitted by the semi-transparent mirror 37. Thus, 27% of P polarized light is received in the photometric element 40.

The proportion of S polarized light and the proportion of P polarized light received in the photometric element 40 can be maintained within a reasonable tolerance range. Therefore, the photometric value can be measured to show a constant proportion, with respect to the luminosity of the image plane, independently of the direction of polarization of the light incident from the photographic lens 31a.

The semi-transparent mirror 37, in accordance with the first preferred embodiment, transmits 59% of the S polarized light and 28% of the P polarized light incident from the photographic lens 31a. Thus, in the case of natural light containing equal amounts of S polarized light and P polarized light, an optical image is imaged by a combined 43.5% amount of light, providing a bright viewfinder image to the photographer. Furthermore, because the photometric element 40 only receives a portion of the transmitted light of the semi-transparent mirror 37, a portion of the surface of the semi-transparent mirror 37 may be formed as a fully reflecting mirror, increasing the amount of light reflected to the viewfinder.

Although the first embodiment of the present invention has been described with respect to a specific configuration, it will be recognized that the first embodiment is not limited to the specific configuration. For example, although the first embodiment has been described with respect to the use of semi-transparent mirrors, one skilled in the art will recognize that any optical dividing member, such as a beamsplitter, may be used.

Also, after having been reflected by the semi-transparent mirror 32, the light passes through the semi-transparent mirror 57, and is received in the photometric element 60. However, photometry can be performed on the light after having been reflected by a second, or even third, semi-transparent mirror.

Further, by locating a semi-transparent mirror in the position of the sub-mirror 33, a condensing lens and photometric element may be located in the position of the rangefinder unit 34. Because the light incident from the photographic lens 31a, after having passed through the semi-transparent mirror 32, is reflected at the semi-transparent mirror of the rear surface and is received in the photometric element, the difference in the light reception ratio due to the direction of polarization of the light is reduced. Furthermore, because the photometric element and the rangefinder unit 34 can be juxtaposed, the structure can be simplified, facilitating a smaller size and lower cost.

Moreover, the photometric device of the present invention has been described as being used in an electronic still camera, but it may be used in a camera performing TTL type photometry, for example, a single lens reflex camera or a video camera and the like.

Furthermore, the semi-transparent mirrors have been described as having the properties shown in FIG. 5, but one skilled in the art will recognize that because the properties of the semi-transparent mirrors can be changed by means of the film thickness of the dielectric film coating the surfaces, semi-transparent mirrors may be prepared and used with properties other than those shown in FIG. 5. Moreover, while negating the polarization properties of the semi-transparent mirrors by combining two of them has been shown, one skilled in the art will recognize that in thus negating the polarization properties of semi-transparent mirrors, the comparison of the separation ratio of S polarized light and the separation ratio of P polarized light may be used, the comparison of the separation ratio of P polarized light and the separation ratio of S polarized light in the semi-transparent mirrors may also be selected to be equal within a tolerance range.

Figure 2:
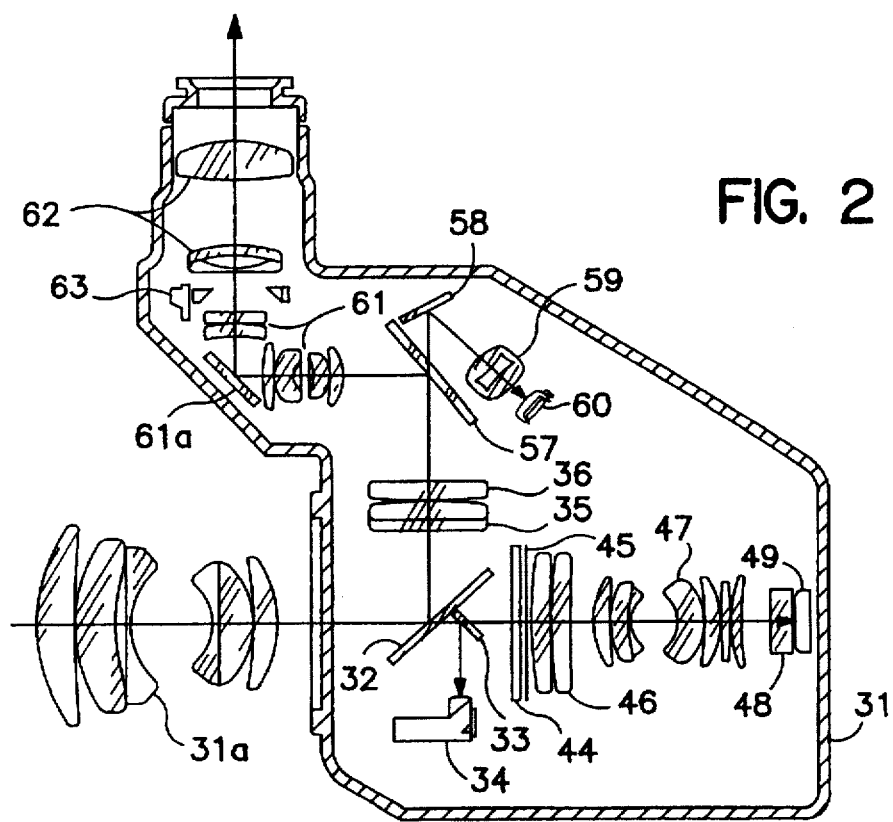
FIG. 2 is a diagram of an electronic still camera having a photometric device in accordance with a second preferred embodiment of the present invention.
Figure 3:
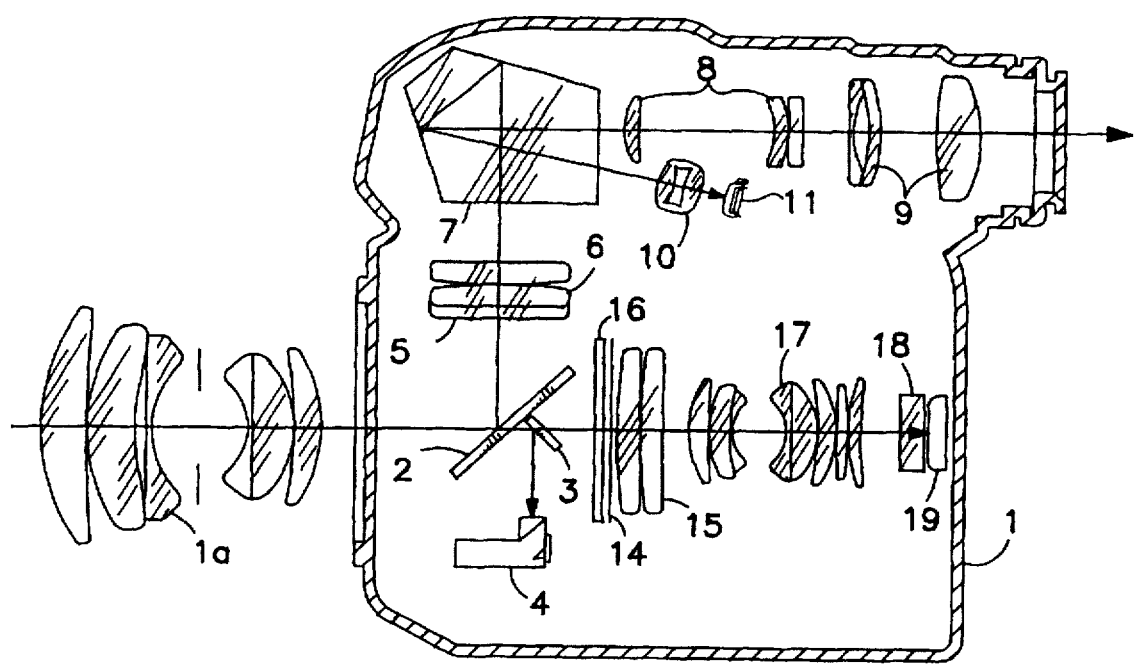
FIG. 3 is a diagram of an electronic still camera having a photometric device in accordance with the prior art.
Figure 4:
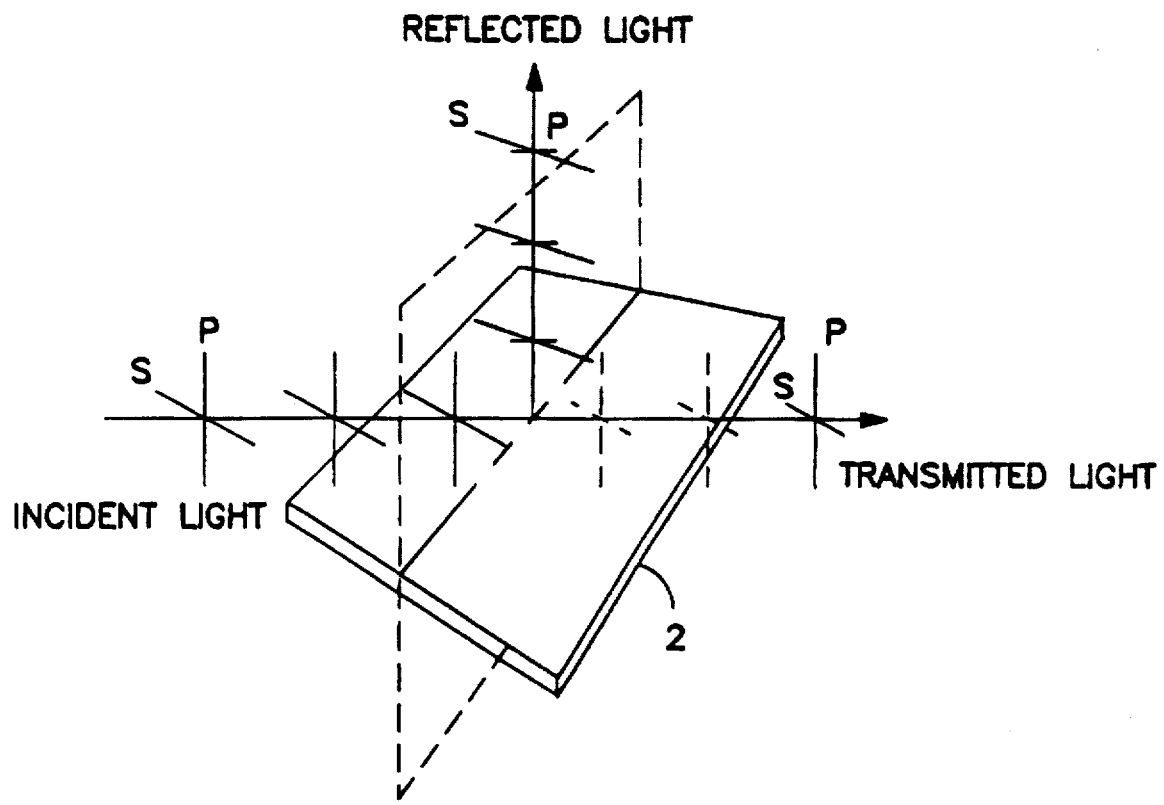
FIG. 4 is a diagram showing the optical properties of a semi-transparent mirror.

FIG. 2 is a diagram of an electronic still camera having a photometric device in accordance with a second embodiment of the present invention. A semi-transparent mirror 57 is located perpendicularly to the semi-transparent mirror 32, in the direction of reflection of light by the semi-transparent mirror 32. A mirror 58, a condensing lens 59 and a photometric element 60 are located at the rear surface of the semi-transparent mirror 57. A relay lens 61 and a mirror 61a are located along the optical axis of the light reflected by the semi-transparent mirror 57. The reflecting surface of the mirror 61a is located parallel to the semi-transparent mirror 57. An ocular lens 62 and a viewfinder display unit 63 are located on the optical axis of the light reflected by the mirror 61a.

Light incident from the photographic lens 31a, after being reflected by the semi-transparent mirror 32, passes through the semi-transparent mirror 57 and is received by the photometric element 60. The selection of a combination of semi-transparent mirrors is performed as in the first preferred embodiment.

Although the second embodiment of the present invention has been described with respect to a specific configuration, it will be recognized that the second embodiment is not limited to a specific configuration. For example, after having been reflected by the semi-transparent mirror 32, the light passes through the semi-transparent mirror 57, and is received in the photometric element 60. However, photometry can be performed on the light after having been reflected by a second, or even third, semi-transparent mirror.

Further, by locating a semi-transparent mirror in the position of the sub-mirror 33, a condensing lens and photometric element may be located in the position of the rangefinder unit 34. Because the light incident from the photographic lens 31a, after having passed through the semi-transparent mirror 32, is reflected at the semi-transparent mirror of the rear surface and is received in the photometric element, the difference in the light reception ratio due to the direction of polarization of the light is reduced. Furthermore, because the photometric element and the rangefinder unit 34 can be juxtaposed, the structure can be simplified, facilitating a smaller size and lower cost.

Moreover, the photometric device of the present invention has been described as being used in an electronic still camera, but it may be used in a camera performing TTL type photometry, for example, a single lens reflex camera or a video camera and the like.

Furthermore, the semi-transparent mirrors have been described as having the properties shown in FIG. 5, but one skilled in the art will recognize that because the properties of the semi-transparent mirrors can be changed by means of the film thickness of the dielectric film coating the surfaces, semi-transparent mirrors may be prepared and used with properties other than those shown in FIG. 5. Moreover, while negating the polarization properties of the semi-transparent mirrors by combining two of them has been shown, one skilled in the art will recognize that in thus negating the polarization properties of semi-transparent mirrors, the comparison of the separation ratio of S polarized light and the separation ratio of P polarized light may be used, the comparison of the separation ratio of P polarized light and the separation ratio of S polarized light in the semi-transparent mirrors may also be selected to be equal within a tolerance range.

Figure 6:
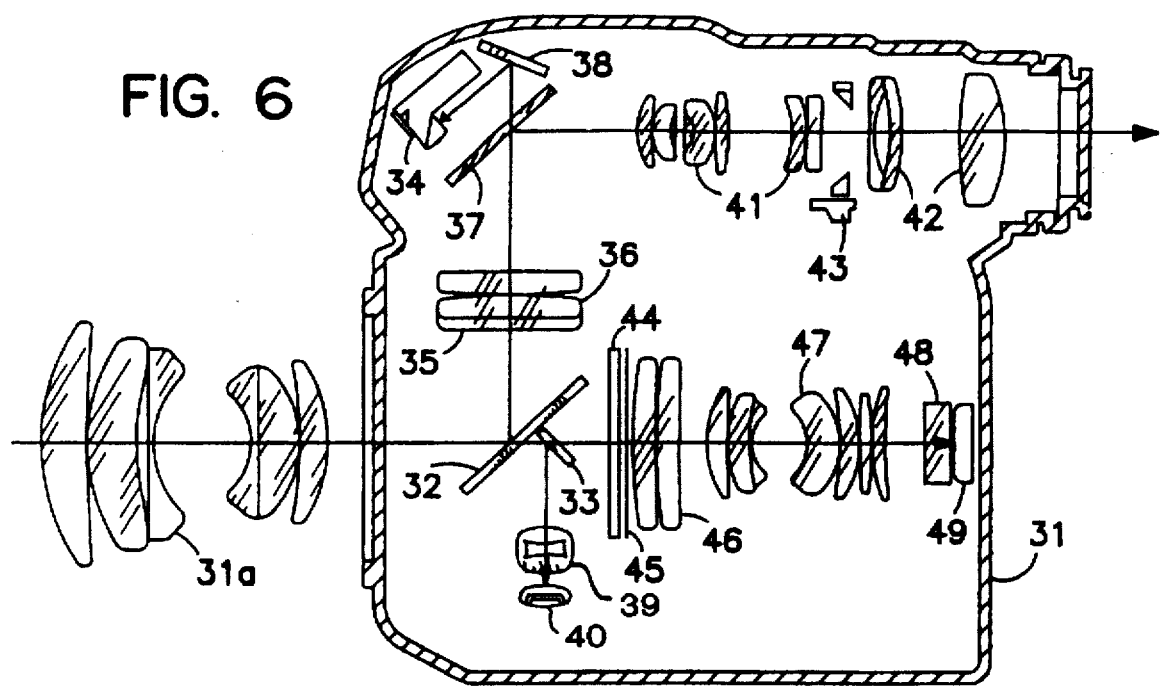
FIG. 6 is a diagram of an electronic still camera having a photometric device in accordance with a third preferred embodiment of the present invention.
Figure 7:
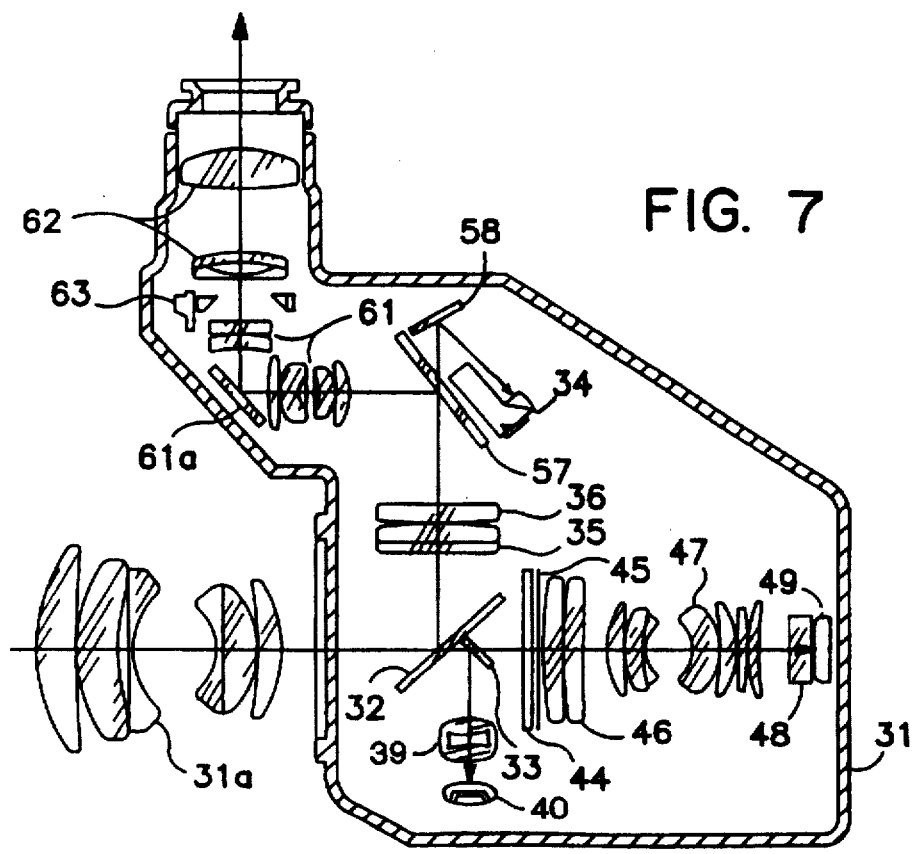
FIG. 7 is a diagram of an electronic still camera having a photometric device in accordance with a third preferred embodiment of the present invention.

FIGS. 6 and 7 are diagrams of electronic still cameras having a photometric device in accordance with the third preferred embodiment of the present invention. Specifically, in FIGS. 6 and 7, an electronic still camera has a semi-transparent mirror 32, the "first optical dividing member", which divides the incident light beam from the photographic lens 31A into a transmitted and a reflected beam. The transmitted beam is then divided by a semi-transparent mirror 33, the "second optical dividing member", into a second transmitted and a second reflected beam. In each case, the second reflected beam is condensed by a condensing lens 39 and received in a photometric element 40. When a release button (not shown) is half-depressed, the photometric element 40 measures the luminosity of a subject. Based upon the luminosity of the subject, an aperture value and a shutter opening timer set by the photographer, or by a microcomputer or the like.

Although a few preferred embodiments of the present invention has been shown and described, it would be appreciated by those skilled in the art that changes may be made in these embodiments without departing from the principles and spirit of the invention, the scope of which is defined in the claims and their equivalents.

By mutually performing reflection and transmission using semi-transparent mirrors, the difference of the ratio of S polarized light received and the ratio of P polarized light received, with respect to the photometric means, can be reduced. Accordingly, the change of the photometric value due to the direction of polarization of the light incident in the photographic lens is reduced, and photometry is performed more accurately.

Further, by making a portion of the surface of a second semi-transparent mirror as a fully reflecting mirror, the reflected beam of the second semi-transparent mirror can be increased. Thus, when the light reflected by the second semi-transparent mirror is used in a viewfinder, the optical image in the viewfinder is brightened.

Further, because the polarized light properties, due to the first semi-transparent mirror, can be negated by the second semi-transparent mirror, accurate photometry can be performed, independently of the direction of polarization of the light incident in the photographic lens.

Because the photometric values can be measured more accurately than in the prior art, independently of the direction of polarization of the light incident from the photographic lens, overexposure or underexposure of the recorded image can be prevented. Moreover, a change of the exposure amount due to the kind of construction of the camera can be suppressed. Furthermore, because accurate photometry can be performed, even with respect to reflected light which has passed through a linear polarization filter, a linear polarization filter can be attached to the camera.

What is claimed is:

1. A photometric device comprising:
   a first optical dividing member to divide incident light into a first reflected beam and a first transmitted beam, said first optical dividing member has a first reflection ratio of P polarized light and a first reflection ratio of S polarized light;
   a second optical dividing member to divide the first reflected beam into a second reflected beam and a second transmitted beam, said second optical dividing member has a second transmission ratio of P polarized light and a second transmission ratio of S polarized light, the product of the first reflection ratio of P polarized light and the second transmission ratio of P polarized light is substantially equal to the product of the first reflection ratio of S polarized light and the second transmission ratio of S polarized light; and a photometric unit to perform photometry on the second transmitted beam.

2. A photometric device as set forth in claim 1, further comprising:

a rangefinding unit to perform rangefinding on the first transmitted beam.

3. A photometric device as set forth in claim 1, wherein said first optical dividing member is located on the optical axis of an optical lens.

4. A photometric device as set forth in claim 1, wherein the second reflected beam passes through a viewfinder.

5. A photometric device as set forth in claim 1, wherein the second transmitted beam has substantially equal portions of S polarized light and P polarized light.

6. A photometric device as set forth in claim 1, wherein said second optical dividing member has a peripheral area which is fully reflective and a central area which is partially reflective.

7. A photometric device as set forth in claim 1, wherein said first optical dividing member is a semi-transparent mirror and said second optical dividing member is a semi-transparent mirror.

8. A photometric device comprising:

a first optical dividing member to divide incident light into a first reflected beam and a first transmitted beam, said first optical dividing member has a first transmission ratio of P polarized light and a first transmission ratio of S polarized light;

a second optical dividing member to divide the first transmitted beam into a second reflected beam and a second transmitted beam, said second optical dividing member has a second reflection ratio of P polarized light and a second reflection ratio of S polarized light, the product of the first transmission ratio of P polarized light and the second reflection ratio of P polarized light is substantially equal to the product of the first transmission ratio of S polarized light and the second reflection ratio of S polarized light; and a photometric unit to perform photometry on the second reflected beam.

9. A photometric device as set forth in claim 8, further comprising:

a rangefinding unit to perform rangefinding on the first reflected beam.

10. A photometric device as set forth in claim 8, wherein said first optical dividing member is located on the optical axis of an optical lens.

11. A photometric device as set forth in claim 8, wherein the second reflected beam has substantially equal portions of S polarized light and P polarized light.

12. A photometric device as set forth in claim 8, wherein said second optical dividing member has a peripheral area which is fully reflective and a central area which is partially reflective.

13. A photometric device as set forth in claim 8, wherein said first optical dividing member is a semi-transparent mirror and said second optical dividing member is a semi-transparent mirror.

14. A photometric device comprising:

a first optical dividing member to divide incident light into a first reflected beam and a first transmitted beam;

a second optical dividing member to divide the first reflected beam into a second reflected beam and a second transmitted beam having substantially equal portions of S polarized light and P polarized light; and a photometric unit to perform photometry on the second transmitted beam.

15. A photometric device as set forth in claim 14, further comprising:

a rangefinding unit to perform rangefinding on the first transmitted beam.

16. A photometric device as set forth in claim 14, wherein said first optical dividing member is located on the optical axis of an optical lens.

17. A photometric device as set forth in claim 14, wherein the second reflected beam passes through a viewfinder.

18. A photometric device as set forth in claim 14, wherein said first optical dividing member has a separation ratio of S polarized light equal to a separation ratio of P polarized light; and said second optical dividing member has a separation ratio of S polarized light equal to a separation ratio of P polarized light.

19. A photometric device as set forth in claim 14, wherein said second optical dividing member has a peripheral area which is fully reflective and a central area which is partially reflective.

20. A photometric device for a camera having a photographic lens and an imaging plane, the photometric device comprising:

a first optical dividing member positioned between the photographic lens and the imaging plane to divide incident light into a first reflected beam and a first transmitted beam, the first optical dividing member having a first reflection ratio of P polarized light and a first reflection ratio of S polarized light;

a second optical dividing member positioned to receive the first reflected beam to divide the first reflected beam into a second reflected beam and a second transmitted beam, the second optical dividing member having a second transmission ratio of P polarized light and a second transmission ratio of S polarized light;

a photometric unit to perform photometry on the second transmitted beam;

wherein the product of the first reflection ratio of P polarized light and the second transmission ratio of P polarized light is substantially equal to the product of the first reflection ratio of S polarized light and the second transmission ratio of S polarized light.

* * * * *